April 21, 1925. Re. 16,050
M. F. BERNSON
JACK
Original Filed July 12, 1921 2 Sheets-Sheet 1
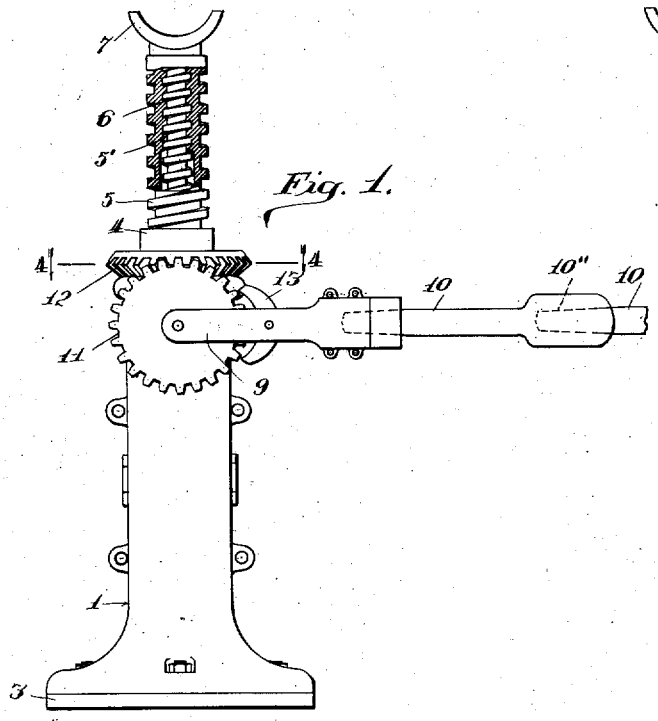
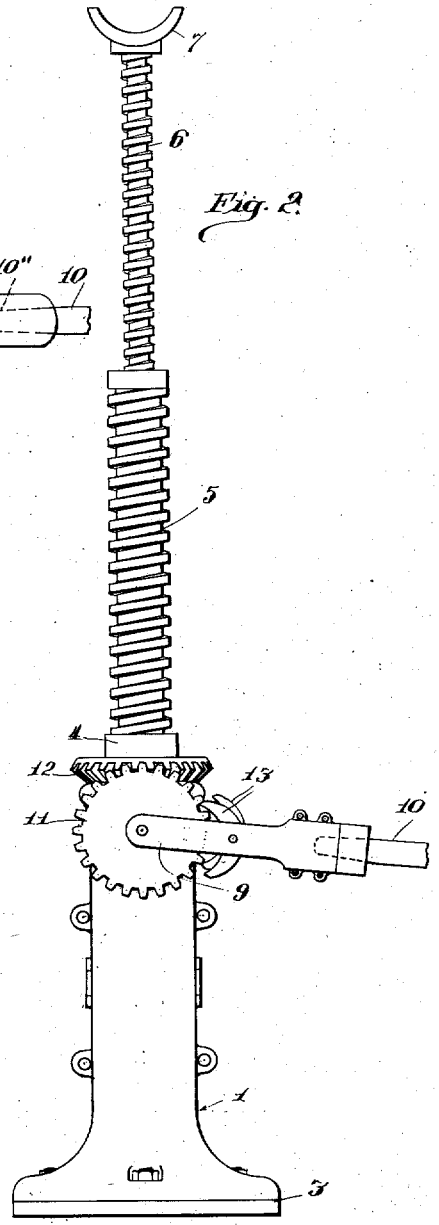
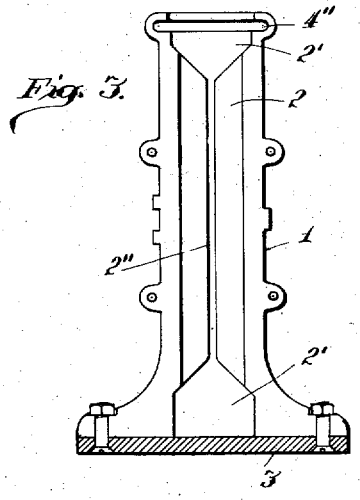
Inventor
Maurice F. Bernson
By Barnett & Truman
Attorneys April 21, 1925. Re. 16,050
M. F. BERNSON
JACK
Original Filed July 12, 1921 2 Sheets-Sheet 2
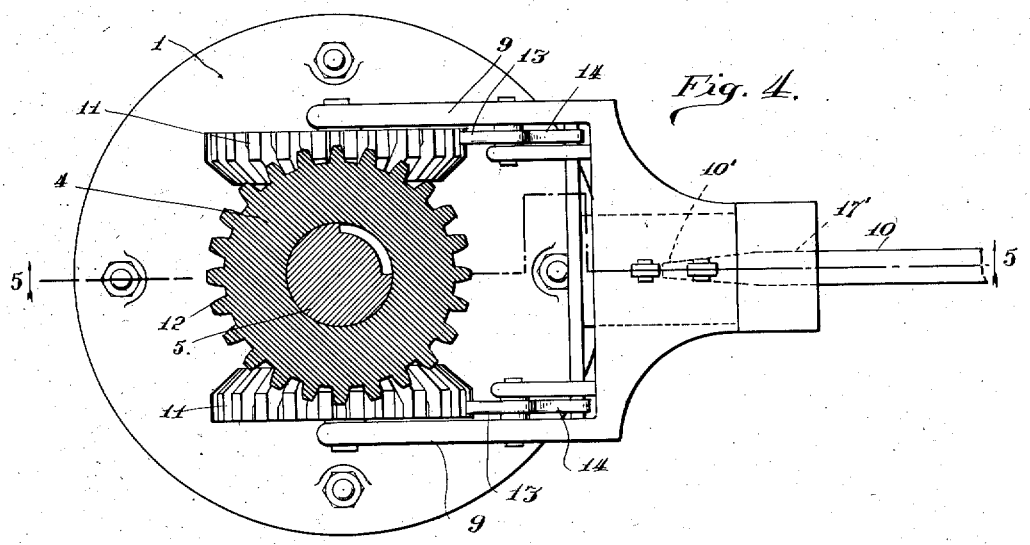
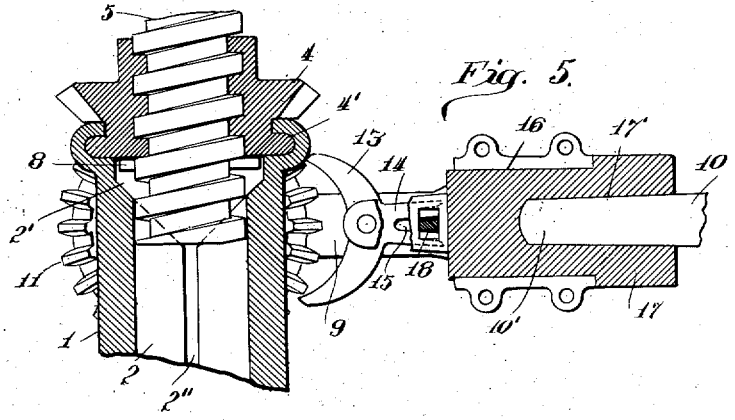
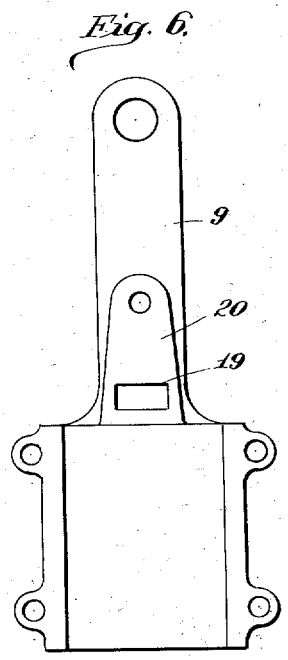
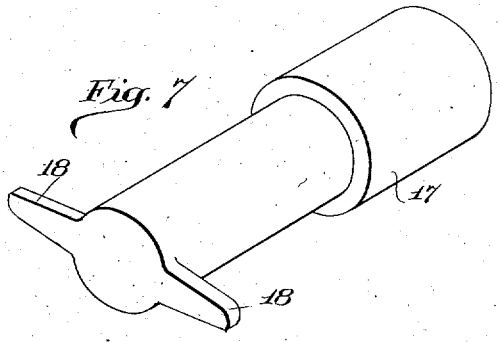
Inventor
Maurice F. Bernson
By
Barnett & Truman
Attorneys Reissued Apr. 21, 1925. Re. 16,050

UNITED STATES PATENT OFFICE.

MAURICE F. BERNSON, OF CANADIAN, TEXAS, ASSIGNOR, BY MESNE ASSIGNMENTS, TO WALKER MANUFACTURING COMPANY, OF RACINE, WISCONSIN, A CORPORATION OF WISCONSIN.

JACK.

Original No. 1,486,723, dated March 11, 1924, Serial No. 484,111, filed July 12, 1921. Application for reissue filed December 17, 1924. Serial No. 756,626.

*To all whom it may concern:*

Be it known that I, MAURICE F. BERNSON, a citizen of the United States, residing at Canadian, in the county of Hemphill, and State of Texas, have invented new and useful Improvements in Jacks, of which the following is a specification.

This invention relates to a lifting jack, the general object of the invention being to provide a number of telescoping parts with means for extending the same to lift or lower the load.

Another object of the invention is to provide the telescopic parts with screw threads and to provide a rotary nut which engages one member with means for holding said member against rotary movement so that the rotation of the nut will move the same longitudinally and means for permitting the said member to rotate at the ends of its longitudinal movement, so that it will cause the second member to move longitudinally while being held against rotary movement by the load.

A still further object of the invention is to provide means for rotating the nut on both the upward and downward movement of the handle.

Another object of the invention is to make the handle in sections and each section so formed as to be capable of use as a tire tool.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which—

Fig. 1 is a side view of the jack in closed position, parts being shown in section.

Fig. 2 is a view of the parts in extended position.

Fig. 3 is an enlarged sectional view of the standard.

Fig. 4 is a section on line 4—4 of Fig. 1.

Figs. 5, 6 and 7 are detailed views. Fig. 5 is a section taken substantially on the line 5—5 of Fig. 4.

In these views 1 indicates the standard or body part of the jack which is preferably formed of two halves, suitably connected together. This standard is provided with a bore 2 which has its ends enlarged, as at 2′. The bore has longitudinally extending grooves 2″ formed in its wall which are arranged diametrically opposite each other and sloping shoulders connect the end walls of the grooves with the enlarged ends of the bore. A base plate 3 is connected with the bottom of the standard and closes the lower end of the bore thereof. A rotary nut 4 is rotatably mounted in the upper end of the standard by having its flange 4′ engaging the annular groove 4″ formed at the top of the standard. A screw threaded member 5 is normally seated in the bore and passes through the nut and a second screw threaded member 6 is normally seated in the member 5 and has its screw threads engaged by the interior screw threads 5′ of member 5. This second member 6 carries the load supporting head 7 at its upper end, said head being formed with the usual concave recess. A pin 8 is transversely arranged in the lower part of member 5 and this pin has its ends projecting and is adapted to engage the grooves 2″ in the standard to prevent rotary movement of member 5, but when said pin is located in the enlargements 2′ of the bore it will be free to turn with the member. As the pin leaves the groove it will engage the inclined walls of the extensions 2′ and will ride up these walls until it reaches the circular parts of the enlargements. It will be noted from Figs. 3 and 5 that these pairs of inclined walls leading from grooves 2″ to the circular enlargements 2′ each extend throughout half of the circumference of the bore, that is, one pair of inclined walls meets the other pair at the lower edge of the circular enlargement 2′. In this way when the rotation of nut 4 is reversed, the ends of pin 8 will engage with certain of these inclined walls and be guided back into the grooves 2″.

It will thus be seen that when the nut is rotated and the pin 8 is in either enlargement of the bore the member 5 will rotate with the nut and as the member 6 is held stationary by the load, said member 6 will be caused to move longitudinally by the screw threads 5′ on member 5. If the pin 8 is in the grooves 2″, however, member 5 will be held against rotary movement so that the rotation of the nut will cause said member 5 to move longitudinally until the pin leaves the grooves and enters one of the enlargements.

The means for rotating the nut comprises a frame 9 pivotally secured to the standard and adapted to be rocked by a handle 10. The pivots of this frame carry a pair of beveled gears 11 which mesh with teeth 12 formed on the nut. A pair of crescent-shaped dogs 13 are pivotally mounted in the frame and are adapted to engage with the gears 11. Each dog is provided with a pair of rearwardly extending ears 14 between which is arranged a U-shaped spring 15 and which is suitably connected with the dog. The outer end of the frame is made in the form of a socket 16 and a sleeve 17 is rotatably mounted in said socket. The inner end of this sleeve is provided with a pair of arms 18 which taper towards their outer ends. These arms pass through slots 19 formed in the projections 20 of the frame and which support the inner ends of the pivot pins of the dogs. The extreme ends of the arms 18 engage the U-shaped springs 15 so that when the sleeve 17 is partly rotated in the socket said arms by their engagement with the spring 15 will cause the dogs to rock upon their pivots, one in one direction and the other in an opposite direction, so that the upper end of one dog will engage the teeth of one of the gears 11 while the lower end of the other dog will engage the teeth of the opposite gear. Thus the rocking movement of the frame will move one gear on its upward stroke and the other gear on its downward stroke and as these gears engage opposite sides of the nut, said nut will be moved on both strokes of the frame. The spring 15 will permit the dogs to ratchet over the teeth of the gears when idling. Slots 19 limit the movement of the arms 18 and the sleeve 17.

The handle 10 is made in sections, each section having a wedge-shaped end 10′ which is adapted to engage a slot 10″ in the enlarged end of the next section, a similar slot 17′ being formed in the sleeve 17 for receiving the wedge-shaped end of the first section of the handle. By placing the wedge-shaped end of the first section in the slot in the sleeve and partly rotating it the dogs can be moved to place them in proper position to either raise the jack or lower the same. It will be seen that the peculiar shape of the handle sections will render them capable of being used as tire tools.

In operation, the jack is placed under the part to be elevated, preferably with one of the screws partially extended so that supporting head 7 will be in engagement with the load, and hence inner screw 6 held against rotation by the load supported thereon. If at this time sleeve 5 is partially elevated, so that the ends of pin 8 are in engagement with the grooves 2″, sleeve 5 will thus be held against rotation and will be elevated through gear 4, when gear 4 is rotated in the proper direction by manipulation of the handle 10. There will at first be no relative rotation between the inner screw 6 and the screw sleeve 5, and these two screw members will move bodily upward together, carrying the load which is supported by the head 7. When sleeve 5 nears the upper limit of its travel, the ends of pin 8 will run out into the enlargements 2′ of the bore, wherein they can rotate, and will eventually come in contact with the lower face of gear 4, locking the sleeve 5 and gear 4 together to turn as a unit. The sleeve 5 now acts as a rotary nut with inner threads 5′, to further elevate the non-rotary screw 6, and the lifting operation will be continued until the load is sufficiently elevated, or until both screws are completely extended.

On the other hand, if at the beginning of the elevating operation, sleeve 5 is completely lowered with the ends of pin 8 in the lower enlargement 2′, the sleeve 5 may at first turn with the gear 4, and elevate the screw 6, and the load carried thereby, until this inner screw 6 is completely extended, whereupon the sleeve 5 will be held from further rotation by means of screw 6, and will then start to move up through the rotary gear 4. The ends of pin 8 will immediately encounter the inclined walls of the extension 2′ and be guided into grooves 2″. If the frictional resistance of screw 6 in threads 5′ in sleeve 5 is greater than the resistance of the threads on sleeve 5 in gear 4, the sleeve 5 will be held against rotation at the start of the operation just described above sufficiently to cause the pin 8 to ride up the inclined extension into grooves 2′, after which the operation is as first described.

For the lowering operation, handle 10 is manipulated to cause rotation of gear 4 in the opposite direction, and an exactly reverse movement of the screws takes place. As long as the inner screw 6 is held against rotation by the load or other means, the screws 5 and 6 will be successively lowered to the desired extent, or until both are completely housed within the standard. As in the elevating operation, it is quite immaterial which screw is lowered first, this depending upon the relative resistance to turning of the two screw and nut engaging portions.

From the above it will be apparent that when the parts are in closed position the jack will be small so as to take up but little room in the tool box and also render it capable of being placed under parts which are close to the surface upon which the jack is seated. It will also be seen that the jack can be extended to a considerable extent so that it will raise the load to a great height and the movement of the parts is secured by the rocking movement of the frame, both strokes of which are utilized to impart movement to the parts.

It is thought from the foregoing description that the advantages and novel features of my invention will be readily apparent.

I desire it to be understood that I may make changes in the construction and in the combination and arrangement of the several parts, provided that such changes fall within the scope of the appended claims.

I claim:

1. A jack of the class described comprising a standard having a bore therein and vertical grooves in the walls of the bore, the ends of the bore being of larger diameter than the major portion thereof with sloping shoulders connecting the enlargements with the walls of the grooves, a nut rotatably connected with the top of the standard, a screw threaded member located in the bore of the standard and passing through the nut, a projection at the lower end of the member for engaging the grooves to prevent rotary movement of the member until the projection reaches the enlargements, ratchet means for rotating the nut, a second screw threaded member located in the first member and having screw threads thereon, the first member being interiorly screw threaded to receive the second member and a supporting head on the upper end of the second member.

2. A jack of the class described comprising a standard formed of two halves bolted together, a base bolted to the lower end of the standard, the upper end of the standard having an annular groove formed therein, a nut having a flange thereon engaging the groove, said standard having a bore therein, the ends of which are enlarged and each half of the standard having a longitudinally extending groove therein and sloping shoulders connecting the end walls of the grooves with the enlarged part of the bore, a screw threaded member located in the bore and passing through the nut, a projection on the member for engaging the grooves to prevent rotary movement of the members until the projection reaches enlargements, a second screw threaded member located in the first member and said first member having screw threads thereon for engaging the screw threads of the second member, ratchet mechanism engaging the nut and a handle for actuating the ratchet mechanism.

3. A lifting jack comprising a standard having a vertical bore and a vertical groove in the walls of the bore, the ends of the bore being of larger diameter than the main bore with sloping shoulders connecting the enlargements with the walls of the groove, a nut rotatably supported at the top of the standard, means for rotating the nut, a screwthreaded member located in the bore of the standard and meshing within the nut, a projection at the lower end of the member for engaging the groove to prevent rotary movement of the member until the projection reaches one of the enlargements, a second threaded member mounted within the first member which is internally threaded to receive the second member, and a load supporting head on the second member.

4. A lifting jack comprising a standard having a vertical bore and a vertical groove in the walls of the bore, one end of the bore being of larger diameter than the main bore with sloping shoulders connecting the enlargement with the walls of the groove, a nut rotatably supported at the top of the standard, means for rotating the nut, a screw-threaded member located in the bore of the standard and meshing within the nut, a projection at the lower end of the member for engaging the groove to prevent rotary movement of the member until the projection reaches the enlargement, a second threaded member mounted within the first member which is internally threaded to receive the second member, and a load supporting head on the second member.

5. A lifting jack comprising a hollow standard, a rotatable interiorly threaded driving member mounted in the standard, an exteriorly threaded sleeve meshing within the driving member and having an interiorly threaded nut in its upper portion, a load-supporting screw meshing within this nut, and means positively preventing rotation of the sleeve throughout its longitudinal travel through the driving member irrespective of the load carried by the screw but permitting it to rotate with the driving member when at the upper limit of its travel.

6. A lifting jack comprising a hollow standard, a rotatable interiorly threaded driving member mounted in the standard, an exteriorly threaded sleeve meshing within the driving member and having an interiorly threaded nut in its upper portion, a screw meshing within this nut, and means positively preventing rotation of the sleeve throughout its longitudinal travel through the driving member irrespective of the load carried by the screw but permitting it to rotate with the driving member when at the lower limit of its travel.

7. A lifting jack comprising a hollow standard, a rotatable interiorly threaded driving member mounted in the standard, an exteriorly threaded sleeve meshing within the driving member and having an interiorly threaded nut in its upper portion, a screw meshing within this nut, and means positively preventing rotation of the sleeve throughout its longitudinal travel through the driving member irrespective of the load carried by the screw but permitting it to rotate with the driving member when at the upper and lower limits of its travel.

8. A lifting jack comprising a hollow standard, a rotatable interiorly threaded driving member mounted in the standard, an exteriorly threaded sleeve meshing within the driving member and having an interiorly threaded nut in its upper portion, a screw meshing within this nut, and means positively preventing rotation of the sleeve throughout its longitudinal travel through the driving member irrespective of the load carried by the screw but permitting it to rotate with the driving member when at the upper and lower limits of its travel, and means for locking the sleeve to the driving member to turn therewith when at the limits of its vertical travel.

9. In a lifting jack, a vertically movable lifting member, means for raising and lowering the member, and guiding means positively preventing rotation of the member about its own axis while moving up or down, and permitting rotation thereof only when at either the upper or lower limits of its travel.

10. In a lifting jack, a vertically movable lifting member, means for raising and lowering the member, and guiding means positively preventing rotation of the member about its own axis while moving up or down, and permitting rotation thereof only when at the upper limit of its travel.

11. A lifting screw comprising a standard, a rotatable driving member, a pair of lifting screws one nested within the other, the outer screw being threaded within the driving member, the inner screw moving bodily with the outer screw when the latter is being raised or lowered, and means for positively enforcing a vertical movement of the inner screw through the outer screw, when the outer screw is at the upper or lower limits of its movement and the inner screw is in engagement with a load.

12. In a lifting jack, a hollow standard, a lifting member vertically movable through the standard, guiding means projecting from the lifting member, cooperating guiding means in the standard for preventing rotation of the lifting member during its vertical movement through the standard, the guiding means in the standard terminating short of the upper and lower ends of the standard whereby the lifting member is permitted to rotate when at the limits of its travel in either direction.

13. In a lifting jack, a hollow standard, a lifting member vertically movable through the standard, guiding means projecting from the lifting member, cooperating guiding means in the standard for preventing rotation of the lifting member during its vertical movement through the standard, the guiding means in the standard terminating short of the upper and lower ends of the standard whereby the lifting member is permitted to rotate when at the limits of its travel in either direction, and means in each end of the standard directing the guiding means on the lifting member into engagement with the guiding means in the standard when the direction of travel of the lifting member is reversed.

14. In a lifting jack, a hollow standard, a lifting member vertically movable through the standard, guiding means projecting from the lifting member, cooperating guiding means in the standard for preventing rotation of the lifting member during its vertical movement through the standard, the guiding means in the standard terminating short of the upper end of the standard whereby the lifting member is permitted to rotate when completely elevated.

15. In a lifting jack, a hollow standard, a lifting member vertically movable through the standard, guiding means projecting from the lifting member, cooperating guiding means in the standard for preventing rotation of the lifting member during its vertical movement through the standard, the guiding means in the standard terminating short of the upper end of the standard whereby the lifting member is permitted to rotate when completely elevated, and means in the upper end of the standard for directing the guiding means on the lifting member into engagement with the guiding means in the standard when the lifting member is lowered.

16. In a lifting jack, a hollow standard, a lifting member vertically movable through the standard, guiding means projecting from the lifting member, cooperating guiding means in the standard for preventing rotation of the lifting member during its vertical movement through the standard, the guiding means in the standard terminating short of the lower end of the standard, whereby the lifting member is permitted to rotate when completely lowered, and means in the lower end of the standard for directing the guiding means on the lifting member into engagement with the guiding means in the standard when the lifting member is again elevated.

17. In a lifting jack, a hollow standard, the bore of which is provided with a vertical guide slot communicating with an enlarged portion of the bore adjacent the upper end of the standard, a lifting member vertically movable through the standard, and a pin extending from the lifting member and moving in the guide slot to prevent rotation of the lifting member while moving vertically, but rotating freely in the enlarged portion of the bore when the lifting member is completely elevated.

18. In a lifting jack, a hollow standard, the bore of which is provided with a vertical guide slot communicating with an enlarged portion of the bore adjacent the upper end of the standard, a lifting member vertically movable through the standard, a pin extending from the lifting member and moving in the guide slot to prevent rotation of the lifting member while moving vertically, but rotating freely in the enlarged portion of the bore when the lifting member is completely elevated, and means within the standard for directing the pin into the guiding slot when the lifting member is again lowered.

19. In a lifting jack, a hollow standard, the bore of which is provided with a vertical guide slot communicating with an enlarged portion of the bore adjacent the lower end of the standard, a lifting member vertically movable through the standard, a pin extending from the lifting member and moving in the guide slot to prevent rotation of the lifting member while moving vertically, but rotating freely in the enlarged portion of the bore when the lifting member is completely lowered, and means within the standard for directing the pin into the guide slot when the lifting member is again elevated.

20. In a lifting jack, a hollow standard, the bore of which is provided with a vertical guide slot communicating with enlarged portions of the bore adjacent the upper and lower ends of the standard, a lifting member vertically movable through the standard, a pin extending from the lifting member and moving in the guide slot to prevent rotation of the lifting member while moving vertically, the pin being adapted to rotate freely with the lifting member in the enlarged portions of the bore when the lifting member is completely raised or lowered.

21. In a lifting jack, a hollow standard, the bore of which is provided with a vertical guide slot communicating with enlarged portions of the bore adjacent the upper and lower ends of the standard, a lifting member vertically movable through the standard, a pin extending from the lifting member and moving in the guide slot to prevent rotation of the lifting member while moving vertically, the pin being adapted to rotate freely with the lifting member in the enlarged portions of the bore when the lifting member is completely raised or lowered and means within the standard for directing the pin into the guide slot when the lifting member is again moved vertically.

22. A lifting jack comprising a hollow standard, a rotatable interiorly threaded driving member mounted in the standard, an exteriorly threaded sleeve meshing within the driving member and having an interiorly threaded portion in its upper end, a screw meshing within this latter threaded portion and adapted to carry the load to be lifted at its upper end, a pin projecting from the lower portion of the sleeve, the bore of the standard having a vertical slot in which the pin travels during the vertical movement of the sleeve, there being an enlarged portion of the bore adjacent the upper end of the standard in which the pin can freely rotate after leaving the slot whereby the sleeve may rotate with the driving member after being completely elevated.

23. A lifting jack comprising a hollow standard, a rotatable interiorly threaded driving member mounted in the standard, an exteriorly threaded sleeve meshing within the driving member and having an interiorly threaded portion in its upper end, a screw meshing within this latter threaded portion and adapted to carry the load to be lifted at its upper end, a pin projecting from the lower portion of the sleeve, the bore of the standard having a vertical slot in which the pin travels during the vertical movement of the sleeve, there being an enlarged portion of the bore adjacent the upper end of the standard in whih the pin can freely rotate after leaving the slot whereby the sleeve may rotate with the driving member after being completely elevated, and means within the standard for directing the pin back into the slot when the driving member is reversely rotated to lower the sleeve.

24. A lifting jack comprising a hollow standard, a rotatable interiorly threaded driving member mounted in the standard, an exteriorly threaded sleeve meshing within the driving member and having an interiorly threaded portion in its upper end, a screw meshing within this latter threaded portion and adapted to carry the load to be lifted at its upper end, a pin projecting from the lower portion of the sleeve, the bore of the standard having a vertical slot in which the pin travels during the vertical movement of the sleeve, there being an enlarged portion of the bore adjacent the lower end of the standard in which the pin can freely rotate after leaving the slot whereby the sleeve may rotate with the driving member after being completely lowered.

25. A lifting jack comprising a hollow standard, a rotatable interiorly threaded driving member mounted in the standard, an exteriorly threaded sleeve meshing within the driving member and having an interiorly threaded portion in its upper end, a screw meshing within this latter threaded portion and adapted to carry the load to be lifted at its upper end, a pin projecting from the lower portion of the sleeve, the bore of the standard having a vertical slot in which the pin travels during the vertical movement of the sleeve, there being an enlarged portion of the bore adjacent the lower end of the standard in which the pin can freely rotate after leaving the slot whereby the sleeve may rotate with the driving member after being completely lowered, and means within the standard for directing the pin back into the slot when the driving member is reversely rotated to elevate the sleeve.

26. A lifting jack comprising a hollow standard, a rotatable interiorly threaded driving member mounted in the standard, an exteriorly threaded sleeve meshing within the driving member and having an interiorly threaded portion in its upper end, a screw meshing within this latter threaded portion and adapted to carry the load to be lifted at its upper end, a pin projecting from the lower portion of the sleeve, the bore of the standard having a vertical slot in which the pin travels during the vertical movement of the sleeve, the bore of the standard having enlarged portions adjacent the upper and lower ends of the standard in which the pin can freely rotate after leaving the guide slot, whereby the sleeve may rotate with the driving member when at either limit of its vertical movement.

27. A lifting jack comprising a hollow standard, a rotatable interiorly threaded driving member mounted in the standard, an exteriorly threaded sleeve meshing within the driving member and having an interiorly threaded portion in its upper end, a screw meshing within this latter threaded portion and adapted to carry the load to be lifted at its upper end, a pin projecting from the lower portion of the sleeve, the bore of the standard having a vertical slot in which the pin travels during the vertical movement of the sleeve, the bore of the standard having enlarged portions adjacent the upper and lower ends of the standard in which the pin can freely rotate after leaving the guide slot, whereby the sleeve may rotate with the driving member when at either limit of its vertical movement, and means within the ends of the standard for directing the pin back into the guide slot when the sleeve is again moved vertically in either direction.

MAURICE F. BERNSON.